United States Patent
Kariya et al.

(10) Patent No.: US 7,610,749 B2
(45) Date of Patent: Nov. 3, 2009

(54) EXHAUST GAS CLEANING APPARATUS HAVING PARTICULATE COLLECTOR FOR USE IN AUTOMOTIVE VEHICLE

(75) Inventors: Yasuhiro Kariya, Obu (JP); Tsukasa Kuboshima, Okazaki (JP); Masao Sawamura, Okazaki (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 0 days.

(21) Appl. No.: 11/635,060

(22) Filed: Dec. 7, 2006

(65) Prior Publication Data

US 2007/0214776 A1    Sep. 20, 2007

(30) Foreign Application Priority Data

Mar. 16, 2006  (JP)  ............... 2006-072635

(51) Int. Cl.
*F01N 3/00* (2006.01)
(52) U.S. Cl. ............... 60/277; 60/285; 60/297; 60/311
(58) Field of Classification Search ............... 60/277, 60/285, 286, 295, 297, 311
See application file for complete search history.

(56) References Cited

U.S. PATENT DOCUMENTS

| | | | | |
|---|---|---|---|---|
| 5,050,376 A | * | 9/1991 | Stiglic et al. ............... | 60/274 |
| 6,041,591 A | * | 3/2000 | Kaneko et al. ............... | 60/274 |
| 6,304,815 B1 | * | 10/2001 | Moraal et al. ............... | 701/115 |
| 6,802,180 B2 | * | 10/2004 | Gabe et al. ............... | 60/285 |
| 7,318,341 B2 | * | 1/2008 | Strohmaier et al. ....... | 73/114.76 |
| 2003/0154710 A1 | | 8/2003 | Plote et al. | |
| 2005/0188686 A1 | | 9/2005 | Saito et al. | |
| 2005/0217250 A1 | | 10/2005 | Kuboshima et al. | |
| 2005/0267670 A1 | * | 12/2005 | Ante et al. ............... | 701/108 |

FOREIGN PATENT DOCUMENTS

| | | |
|---|---|---|
| JP | 2003-155920 | 5/2003 |
| JP | 2004-52642 A | 2/2004 |

OTHER PUBLICATIONS

Examination Report dated Jul. 29, 2008 in DE Patent Application No. 10 2007 000 094.6-26 with English translation.

* cited by examiner

*Primary Examiner*—Thomas E Denion
*Assistant Examiner*—Diem Tran
(74) *Attorney, Agent, or Firm*—Nixon & Vanderhye PC

(57) ABSTRACT

An exhaust gas cleaning apparatus (e.g., for a diesel engine) uses a collector for collecting particulates contained in the exhaust gas and is disposed in an exhaust pipe of the engine. Damages in the collector are detected based on a pressure difference between an inlet and an outlet of the collector. In order to correctly detect the damages based on the pressure difference, an exhaust gas volume flowing through the collector is increased to a target volume by raising exhaust gas temperature. The exhaust gas temperature is raised by injecting fuel into the engine at a time when an engine output is not increased by such fuel injection. The pressure difference, based on which damages in the collector are detected, is measured after the exhaust gas volume has reached the target volume. It is determined that damages in the collector have occurred if the pressure difference is lower than a predetermined value.

19 Claims, 3 Drawing Sheets

FIG. 1
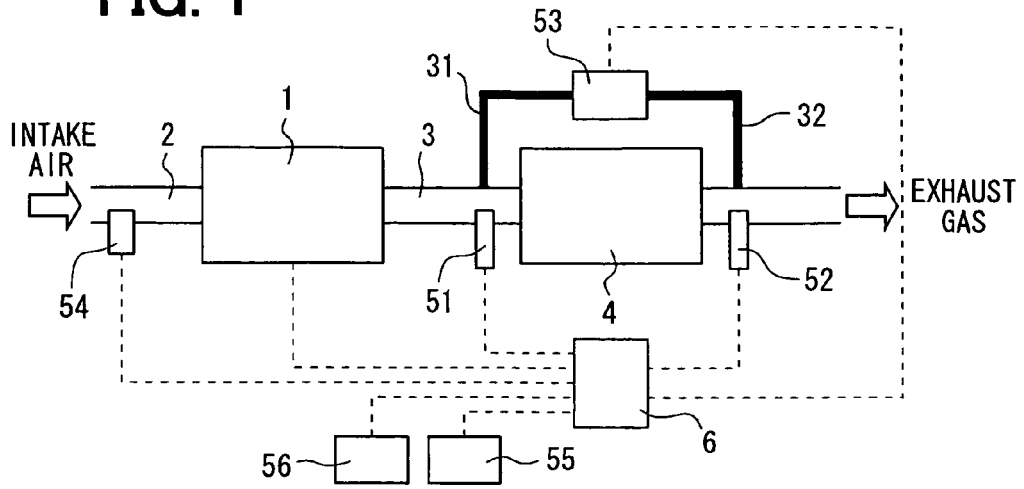
FIG. 2A
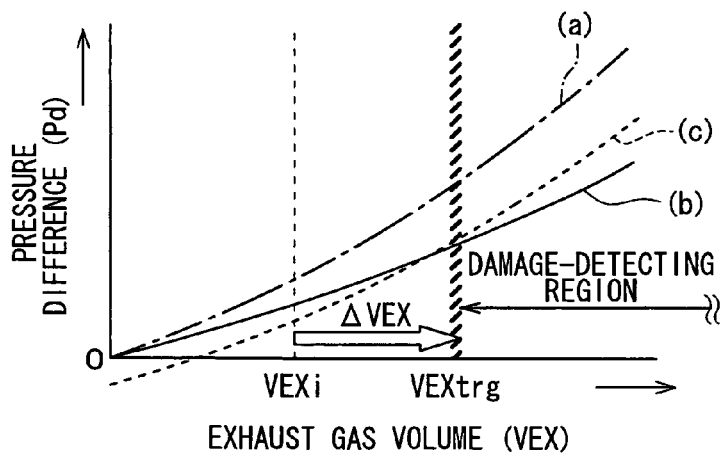
FIG. 2B
$$\left\{ VEXtrg = \left( Ga \times \frac{22.4}{28.8} + Q \times \frac{0.45}{13.8} \times 22.4 \right) \times \frac{(T + \Delta T) + 273}{273} \times \frac{101.325}{P + 101.325} \times 60 \right. \quad (1)$$
$$\left. \Delta T = \left\{ VEXtrg \times \left( \frac{1}{Ga} \times \frac{28.8}{22.4} + \frac{1}{Q} \times \frac{13.8}{0.45 \times 22.4} \right) \times 273 \times \frac{P + 101.325}{101.325} \times \frac{1}{60} \right\} - (T + 273) \right. \quad (2)$$

EXHAUST GAS CLEANING APPARATUS HAVING PARTICULATE COLLECTOR FOR USE IN AUTOMOTIVE VEHICLE

CROSS-REFERENCE TO RELATED APPLICATION

This application is based upon and claims benefit of priority of Japanese Patent Application No. 2006-72635 filed on Mar. 16, 2006, the content of which is incorporated herein by reference.

BACKGROUND OF THE INVENTION

1. Field of the Invention

The present invention relates to an exhaust gas cleaning apparatus having a particulate collector for use in an automotive vehicle.

2. Description of Related Art

Recently, an exhaust gas cleaning apparatus having a collector for collecting particulates exhausted from a diesel engine has been used. The collector is made of ceramics having plural small passages through which exhaust gas from a diesel engine flows. Particulates contained in the exhaust gas adhere to walls separating the small passages, and thereby the particulates are trapped in the collector. As an amount of particulates trapped in the collector becomes large, a pressure loss in the collector increases. The amount of accumulated particulates is estimated based on a pressure difference measured at upstream and downstream ends of the collector.

When the estimated amount of accumulated particulates reaches a predetermined level, the accumulated particulates are burnt to regenerate the collector. More particularly, fuel (unburned hydrocarbon) is supplied to an oxidizing catalyst contained in the collector by means of a post injection (a fuel injection performed after a main injection, not to contribute to generation of power). By oxidizing the hydrocarbon, a temperature in the collector is increased to thereby burn the accumulated particulates.

On the other hand, if the collector is damaged due to dropping-off or melting-down of a downstream portion of the collector, the pressure difference between the upstream end and the downstream end of the collector becomes smaller than a normal pressure difference. Accordingly, such damages in the collector are detected based on the pressure difference. An example of this kind of damage detection device is disclosed in JP-A-2003-155920. In this device, however, it is difficult to correctly detect the damages in the collector based on the pressure difference because changes in the pressure difference are not large enough when an amount of exhaust gas is small.

SUMMARY OF THE INVENTION

The present invention has been made in view of the above-mentioned problem, and an object of the present invention is to provide an improved exhaust gas cleaner, in which damages in the particulate collector are more surely detected without fail.

An exhaust gas cleaning apparatus is disposed in an exhaust pipe of an internal combustion engine. The exhaust gas cleaning apparatus includes a collector for collecting particulates contained in exhaust gas from an internal combustion engine such as a diesel engine. If a pressure difference between an inlet and an outlet of the collector becomes lower than a predetermined value, it is determined that damages, such as dropping-off or melting-down of a downstream portion of the collector, have occurred. It is difficult, however, to surely detect a decrease in the pressure difference when an exhaust gas volume flowing through the collector is small.

In order to more surely detect changes in the pressure difference, the exhaust gas volume is increased to a target volume. A temperature rise in the exhaust gas, which is necessary to increase the exhaust gas volume to the target volume, is first calculated, and fuel for realizing such temperature rise is injected into the engine at a timing when such fuel injection does not increase an output of the engine (referred to as a post injection).

The pressure difference between the inlet and the outlet of the collector is measured after the exhaust gas volume flowing through the collector has reached the target volume. If the pressure difference is smaller than a predetermined value, it is determined that damages in the collector occurred. Preferably, if the temperature in the exhaust gas is expected to be raised by the post injection beyond a predetermined temperature limit, the post injection is not performed to prevent a catalyst disposed in the collector from being deteriorated.

According to an exemplary embodiment of the present invention, the damages in the collector are more surely detected without fail. Other objects and features of the present invention will become more readily apparent from a better understanding of the preferred embodiment described below with reference to the following drawings.

BRIEF DESCRIPTION OF THE DRAWINGS

FIG. 1 is a block diagram showing an entire system for cleaning exhaust gas from an internal combustion engine;

FIG. 2A is a graph showing a relation between an amount of exhaust gas and a pressure difference between an upstream end and a downstream end of a particulate collector.

FIG. 2B shows formula (1) for calculating a target flow amount of exhaust gas and formula (2) for calculating a temperature rise required for increasing a flow amount to the target flow amount;

DETAILED DESCRIPTION OF THE PREFERRED EMBODIMENT

Figure 3:
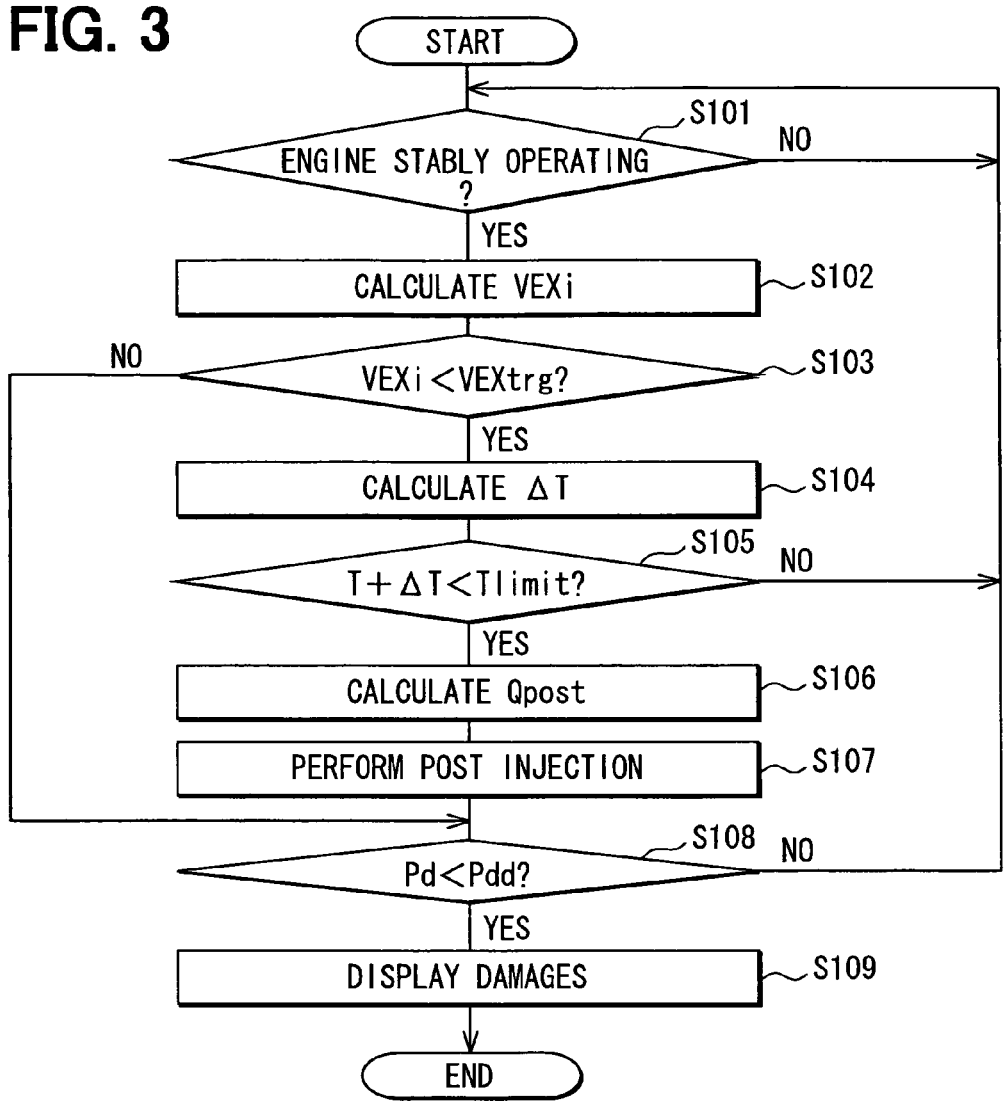
FIG. 3 is a flowchart showing a process of detecting damages in a particulate collector.

A preferred embodiment of the present invention will be described with reference to accompanying drawings. As shown in FIG. 1, an intake air passage 2 and an exhaust pipe 3 through which exhaust gas flows are connected to a diesel engine 1. In the exhaust pipe 3, a collector 4 for collecting particulates contained in the exhaust gas is connected. A diesel particulate filter (referred to as a DPF) is contained in the collector 4. The DPF is a porous honeycomb filter made of cordierite or silicon carbide. The particulates in the exhaust gas accumulate on surfaces of the DPF, on which oxidizing catalyst made of materials such as platinum or a palladium is held. The oxidizing catalyst help the particulates burn under a predetermined condition at a proper temperature.

A first temperature sensor 51 is disposed at an upstream end of the collector 4 to measure a temperature of exhaust gas flowing into the DPF (an inlet temperature), and a second temperature sensor 52 is disposed at a downstream end of the collector 4 to measure a temperature of exhaust gas flowing out of the DPF (an outlet temperature). A first branch 31 branching out from the exhaust pipe 3 is connected to the upstream end of the collector 4, and a second branch 32 branching out from the exhaust pipe 3 is connected to the downstream end of the collector 4.

A pressure sensor 53 for detecting a pressure difference between the upstream end and the downstream end of the collector 4 (simply referred to as a pressure difference Pd) is disposed between the first branch 31 and the second branch 32. An airflow meter 54 is disposed in the intake air passage 2 to detect an amount of intake air sucked into the engine 1. An accelerator sensor 55 for measuring a pressing-down amount of an accelerator pedal (not shown) is connected to the accelerator pedal. A rotational speed of the engine 1 is measured by an engine speed sensor 56.

Output signals from the airflow meter 54, the engine speed sensor 56 and the accelerator sensor 55 are fed to an electronic control unit 6 (referred to as an ECU). The ECU 6 is a known microcomputer including a CPU, a ROM, a RAM and an EEPROM. The ECU 6 performs various functions, such as control of an amount of fuel injected into the engine 1, regeneration of the collector 4 and detection of damages in the collector 4, according to programs stored therein.

The damages in the collector 4, such as dropping-off or melting-down of a downstream portion of the collector, are detected in the following manner. As shown in FIG. 2A, a pressure difference measured by the pressure sensor 53 increases as an amount of exhaust gas increases. The amount of exhaust gas is always expressed as an amount in volume throughout this specification. Line (a) in FIG. 2A shows a lower limit of the pressure difference when the collector 4 is normal, line (b) shows a permissible lower limit of the pressure difference when the collector 4 is damaged. Line (c) shows a damage-detection level (Pdd) of the pressure difference. Namely, if the pressure difference (pd) is lower than the damage-detection level (Pdd), it is determined that the collector 4 is damaged. Though the permissible lower limit is shown by line (b), the damage-detection level (Pdd) is set to a little higher level than the permissible level in a region for detecting damages, considering a safety margin.

In order to accurately detect the damages in the collector 4, it is necessary to measure the pressure difference under a condition where a flow amount of the exhaust gas is higher than a certain level. Such a level is referred to as a target flow amount of the exhaust gas VEXtrg (liter/minute). If a present flow amount VEXi (liter/minute) is lower than VEXtrg, the flow amount is forcibly increased by $\Delta VEX$ (=VEXtrg−VEXi) to increase the flow amount to the level of VEXtrg. The flow amount is increased by increasing a temperature of the exhaust gas to a temperature level corresponding to the target flow amount VEXtrg.

The target flow amount VEXtrg is calculated according to formula (1) shown in FIG. 2B. In the formula (1), Ga (gram/sec) is a flow amount of the intake air in quantity; Q (gram/sec) is an amount of fuel consumption; T(° C.) is a present temperature of the exhaust gas in the collector 4; $\Delta T$(° C.) is an amount of temperature rise in the exhaust gas, required for increasing the flow amount of the exhaust gas by $\Delta VEX$; and P(kPa) is a pressure at an upstream end of the collector 4. In the formula (1), the term Ga×22.4/28.8 is a term for converting the flow amount of the intake air Ga in quantity to a flow amount of the intake air in volume; the term Q×0.45×22.4/13.8 is a term for converting the fuel consumption Q in quantity to fuel consumption in flow volume; the term $[(T+\Delta T)+273]/273$ is a temperature adjustment term for the flow amount in volume; the term 101.325/(P+101.325) is a temperature adjustment term for the flow amount in quantity; and 60 at the last is a number for converting a flow amount per second to a flow amount per minute. Formula (2) for calculating the exhaust gas temperature rise $\Delta T$(° C.) shown in FIG. 2B is derived from formula (1).

The process of detecting damages in the collector 4 will be further described with reference to a flowchart shown in FIG. 3. At step S101, whether the engine is normally operated is determined. That is, when both of an amount of change per unit time in the flow amount of the exhaust gas and an amount of change per unit time in the pressure difference between the upstream end and the downstream end of the collector 4 are small, it is determined that the engine is normally or stably operated.

If the engine is normally operated, the process proceeds to step S102, where the present flow amount of the exhaust gas VEXi is calculated. VEXi is calculated by converting the flow amount of the intake air Ga in quantity based on a present temperature T in the collector 4 and a pressure P at the upstream end of the collector 4. The present temperature T in the collector 4 is calculated by adding a temperature rise in the collector 4 due to reaction heat in the collector 4 to the temperature at the upstream end of the collector 4 measured by the first temperature sensor 51. The temperature rise in the collector 4 due to reaction heat is proportional to an amount of hydrocarbon fed to the collector 4. Accordingly, the temperature rise in the collector can be calculated based on the amount of hydrocarbon fed to the collector, which is in turn estimated from an amount of post injection.

The pressure P at the upstream end of the collector 4 is calculated by adding the pressure difference detected by the pressure sensor 53 to the pressure at the downstream end of the collector 4. The pressure at the downstream end of the collector 4 is obtained from a map stored in the ROM contained in the ECU. The map shows the pressure at the downstream end of the collector 4 corresponding to rotational speed of the engine and the amount of intake air.

Then, at step S103, whether the present amount of exhaust gas VEXi is smaller than the target amount VEXtrg stored in the ROM is determined. If the VEXi is smaller than VEXtrg (i.e., the present amount of the exhaust gas is not large enough for correctly detecting damages in the collector 4), the process proceeds to step S104, where the temperature rise $\Delta T$ in the collector which is necessary for increasing the present amount of exhaust gas VEXi to the target amount VEXtrg is calculated according to the formula (2) shown in FIG. 2B. The formula (2) is stored in the ROM. Then, at step S105, whether the temperature in the collector is lower than a temperature limit Tlim even after the temperature in the collector is increased by $\Delta T$. In other words, whether $(T+\Delta T)$ is lower than the Tlim is determined, i.e., whether the collector temperature does not exceed the temperature limit that is set for protecting the catalyst in the collector). The temperature limit Tlim is set to a temperature at which the catalyst deteriorates or a temperature somewhat lower than that.

Figure 4:
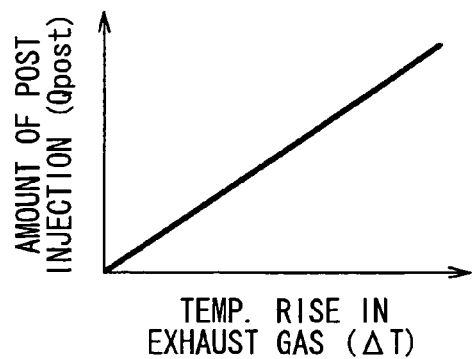
FIG. 4 is a graph showing a relation between a temperature rise in the exhaust gas and an amount of post injection.

If the expected temperature $(T+\Delta T)$ is lower than the temperature limit Tlim, the process proceeds to step S106, where an amount of the post injection Qpost that is necessary to increase the collector temperature by $\Delta T$ is calculated. The amount of the post injection Qpost is easily calculated from the required temperature rise $\Delta T$ because Qpost is proportional to $\Delta T$ as shown in FIG. 4. Then, at step S107, the amount of fuel Qpost is injected into the engine by performing the post injection. The post injection is performed when it does not contribute to generation of the engine power, i.e., the fuel is injected during an exhaust stroke of the engine. The temperature in the collector 4 is increased by the post injection, and thereby the amount of exhaust gas in volume increases to the target volume VEXtrg.

Then, at step S108, whether the pressure difference Pd between the upstream end and the downstream end of the collector 4 is lower than a damage-detection pressure level Pdd shown in FIG. 2A. The damage-detection pressure level Pdd is stored in the ROM. If Pd is lower than Pdd, the process proceeds to step S109, where a warning lamp mounted on an instrument panel is lit, and a flag for prohibiting regeneration of the collector 4 is set in the ECU. Then, the process comes to the end.

On the other hand, if it is determined that the engine is not normally operated at step S101, the process stays there until the engine operation becomes normal. This is because the damage-detection is not correctly performed when the engine is not normally operated. If it is determined that the present amount of exhaust gas VEXi is higher than the target amount VEXtrg, the process directly proceeds to step S108 because it is not necessary to increase the exhaust gas amount in this situation. If it is determined that the expected temperature (T+ΔT) is higher than the temperature limit Tlim at step S105, the process returns to step S101 without performing the post injection to protect the catalyst. If it is determined that Pd is higher than Pdd, i.e., damages are not detected in the collector, the process returned to S101.

Figure 5:
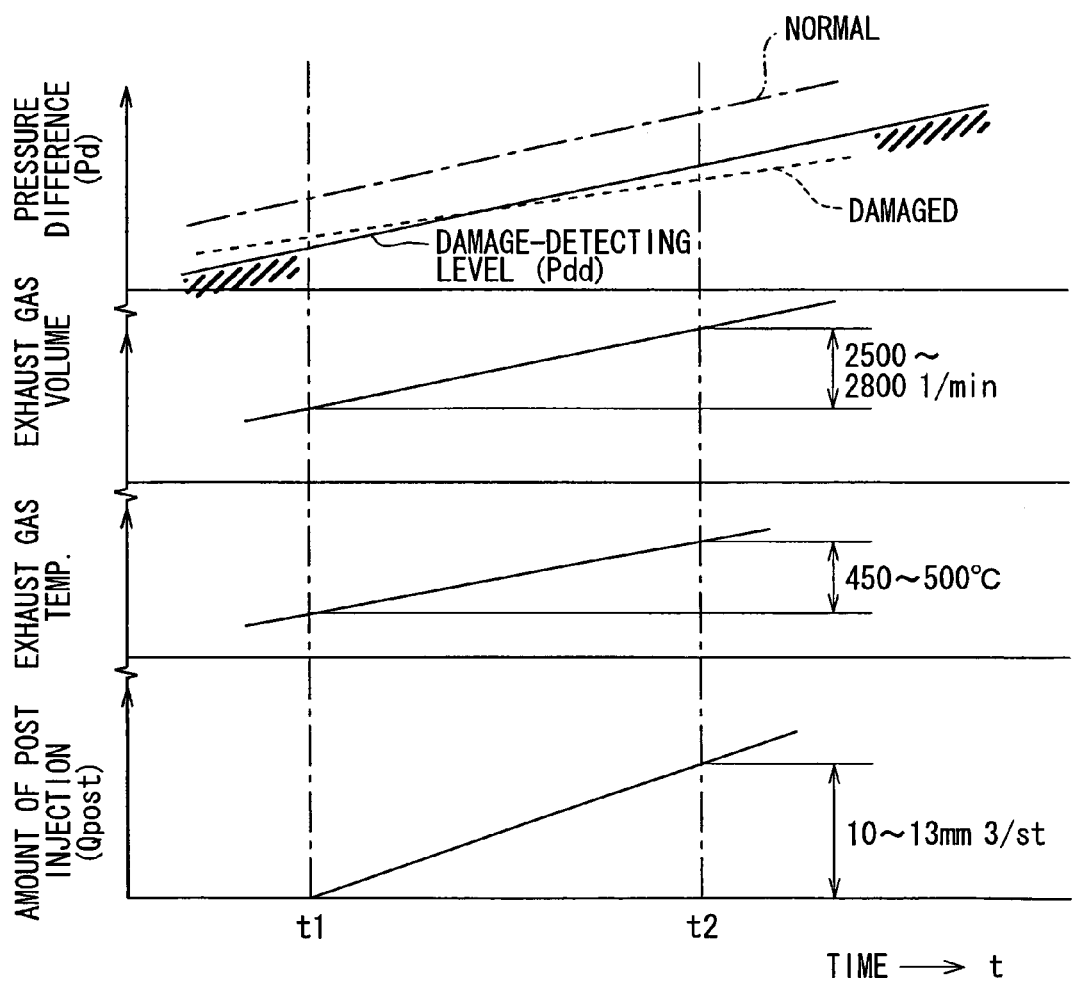
FIG. 5 are time charts showing the process of detecting damages in the particulate collector.

With reference to time charts shown FIG. 5, the process of detecting damages in the collector 4 will be further explained. An example shown in FIG. 5 shows the detection process which is performed for a four-cylinder diesel engine having 2000 CC displacement driven at 2200 rpm, driving a vehicle at 60 km/h. The target amount of exhaust gas VEXtrg is set to 4500 liter/mm, which is necessary for correctly detecting that an ability of the collector 4 for collecting diesel particulates has decreased to a level of 25 percent of an original ability. The damages in the collector 4 usually occur when a downstream portion of the collector 4 drops off or melts down by heat.

At time t1, the vehicle is driven at 60 km/h, a flow amount of exhaust gas is 2000 l/m, and a exhaust gas temperature is 200° C. By performing a post injection, the temperature in the collector 4 is increased by 450-500° C. to reach 650-700° C. A temperature rise of 40-50° C. is attained by the post injection in an amount of 1 mm$^3$/stroke. This means that the exhaust gas temperature rises to 650-700° C. by performing the post injection in an amount of 10-13 mm$^3$/stroke. According to the temperature increase in the collector 4, the flow amount of the exhaust gas in volume increases by 2500-2800 l/m, thereby reaching 4500-4800 l/m. In this manner, the damages in the collector 4 are accurately detected.

Advantages attained in the present invention are summarized below. The temperature rise ΔT required for attaining the target exhaust gas volume VEXtrg flowing through the collector is calculated. Then, the post injection is performed to raise the temperature by ΔT, and the exhaust gas volume reaches the target volume VEXtrg which is necessary to correctly detect the damages in the collector 4. If the exhaust gas temperature were raised to a target temperature by simply performing the post injection, the exhaust gas volume attained by the temperature rise would vary according to an initial temperature of the exhaust gas. The exhaust gas volume would be less or more than the amount required for correctly detecting the damages. This means that the post injection would be performed in an excessive amount, resulting in waste of fuel, or in a too small amount, resulting in inability of correct detection of the damages. In addition, the post injection is not performed in the present invention in the case where the expected temperature (T+ΔT) exceeds the temperature limit Tlim. Therefore, the catalyst in the collector is prevented from deteriorating by excessive heat.

The present invention is not limited to the embodiment described above, but it may be variously modified. For example, instead of performing the post injection, injection timing may be delayed to decrease efficiency of the engine and to raise the exhaust gas temperature. It may be possible to inject fuel at an upstream portion of the collector to raise the exhaust gas temperature. Further, instead of performing the post injection, the exhaust gas volume may be increased by various methods, such as by squeezing an EGR (exhaust gas recirculation) valve, by increasing an opening degree of an intake air orifice, by squeezing an opening of a variable turbo nozzle, or by decreasing a ratio of a transmission. The exhaust gas amount can be increased by performing one or more of the above-exemplified methods.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An exhaust gas cleaning apparatus for an internal combustion engine, comprising:
    a collector for collecting particulates contained in exhaust gas of the internal combustion engine;
    a pressure sensor for detecting a pressure difference between an inlet and an outlet of the collector; and
    means for detecting damage in the collector that results in a decrease in pressure difference between the inlet and the outlet of the collector based on the pressure difference detected by the pressure sensor, wherein:
    the detecting means includes means for determining whether an exhaust gas volume passing through the collector is lower than a target volume corresponding to a pressure difference and means for increasing the exhaust gas volume if the exhaust gas volume is lower than the target volume thereby also increasing the pressure difference while detecting collector damage.

2. The exhaust gas cleaning apparatus as in claim 1, wherein:
    the means for increasing increases temperature of the exhaust gas.

3. The exhaust gas cleaning apparatus as in claim 2, wherein:
    the means for increasing supplies fuel to the internal combustion engine to increase temperature of the exhaust gas under a condition not to increase an output of the internal combustion engine.

4. The exhaust gas cleaning apparatus as in claim 3, further including means for controlling an amount of fuel to be supplied by the means for increasing, wherein:
    the means for controlling calculates a temperature rise in the exhaust gas that is necessary for increasing the exhaust gas volume to the target volume and calculates an amount of fuel that is necessary for realizing the calculated temperature rise in the exhaust gas.

5. The exhaust gas cleaning apparatus as in claim 4, wherein:
    the means for increasing supplies the fuel to the internal combustion engine for raising the temperature of the exhaust gas only when the temperature of the exhaust gas that is expected to be realized by supplying the amount of fuel calculated by the controlling means is lower than a predetermined temperature limit.

6. The exhaust gas cleaning apparatus as in claim 5, wherein:

a catalyst for promoting exhaust gas cleaning is disposed in the collector, and the predetermined temperature limit is a temperature, at a higher temperature than which the catalyst deteriorates.

7. A process of detecting damage of a collector for collecting particulates included in exhaust gas of an internal combustion engine, the process comprising:
checking whether the engine is stably operating;
calculating a present exhaust gas volume if the engine is stably operating;
determining whether the present exhaust gas volume is smaller than a target volume that is necessary for detecting damage of the collector, said target volume corresponding to a pressure differential across the collector;
calculating, if the present exhaust gas volume is smaller than the target volume, a temperature rise in the exhaust gas that is necessary to increase the present exhaust gas volume to the target volume and thereby correspondingly also increase the pressure differential;
when exhaust gas temperature that is expected to be otherwise realized is lower than a predetermined temperature limit, supplying fuel to the engine under a condition not to increase an output of the engine, so that the temperature rise that is necessary to increase the exhaust gas volume to the target volume is realized;
detecting a pressure difference between an inlet and an outlet of the collector after the exhaust gas volume reaches the target volume; and
determining that the collector is damaged if the pressure difference is smaller than a predetermined value.

8. A method for detecting damage of a collector for collecting particulates contained in exhaust gas of an internal combustion engine having a pressure sensor for detecting a pressure difference between an inlet and an outlet of the collector, said method comprising:
determining whether an exhaust gas volume passing through the collector is lower than a target volume corresponding to a pressure difference across the collector and increasing the exhaust gas volume if the exhaust gas volume is lower than the target volume corresponding to a pressure difference across the collector; and
detecting damage in the collector of the type that causes a decreased pressure difference across the collector based on the pressure difference detected by the pressure sensor while the exhaust gas volume is maintained at or above said target volume.

9. The method of claim 8 wherein:
the temperature of the exhaust gas is increased to increase its volume.

10. The method of claim 9 wherein:
fuel is supplied to the internal combustion engine to increase temperature of the exhaust gas under a condition not to increase an output of the internal combustion engine.

11. The method of claim 10 further including controlling an amount of fuel to be supplied by the means for increasing, wherein:
a temperature rise in the exhaust gas that is necessary for increasing the exhaust gas volume to the target volume is calculated and an amount of fuel that is necessary for realizing the calculated temperature rise in the exhaust gas is also calculated.

12. The method of claim 11 wherein:
fuel is supplied to the internal combustion engine for raising the temperature of the exhaust gas only when the temperature of the exhaust gas, that is expected to be realized by supplying the calculated amount of fuel, is lower than a predetermined temperature limit.

13. The method of claim 12 wherein:
a catalyst for promoting exhaust gas cleaning is disposed in the collector, and the predetermined temperature limit is a temperature, at a higher temperature than which the catalyst deteriorates.

14. An exhaust gas cleaning apparatus for an internal combustion engine, said apparatus comprising:
a collector for collecting particulates contained in exhaust gas of the internal combustion engine;
a pressure sensor for detecting a pressure difference between an inlet and an outlet of the collector; and
means for detecting damages in the collector that result in a decrease in pressure difference detected by the pressure sensor,
wherein the detecting means includes (a) means for determining whether an exhaust gas volume passing through the collector is lower than a target volume which is necessary to correctly detect the damages in the collector, and (b) means for increasing the exhaust gas volume to the target volume if the exhaust gas volume is lower than the target volume.

15. The exhaust gas cleaning apparatus as in claim 14 wherein the means for increasing increases exhaust gas volume by increasing temperature of the exhaust gas.

16. The exhaust gas cleaning apparatus as in claim 15 wherein:
the means for increasing supplies fuel to the internal combustion engine to increase temperature of the exhaust gas under a condition not to increase an output of the internal combustion engine.

17. The exhaust gas cleaning apparatus as in claim 16 further including means for controlling an amount of fuel to be supplied by the means for increasing, wherein:
the means for controlling calculates a temperature rise in the exhaust gas that is necessary for increasing the exhaust gas volume to the target volume and calculates an amount of fuel that is necessary for realizing the calculated temperature rise in the exhaust gas.

18. The exhaust gas cleaning apparatus as in claim 17 wherein:
the means for increasing supplies the fuel to the internal combustion engine for raising the temperature of the exhaust gas only when the temperature of the exhaust gas that is expected to be realized by supplying the amount of fuel calculated by the controlling means is lower than a predetermined temperature limit.

19. The exhaust gas cleaning apparatus as in claim 18 wherein:
a catalyst for promoting exhaust gas cleaning is disposed in the collector, and the predetermined temperature limit is a temperature, at a higher temperature than which the catalyst deteriorates.

* * * * *